Figure 5:
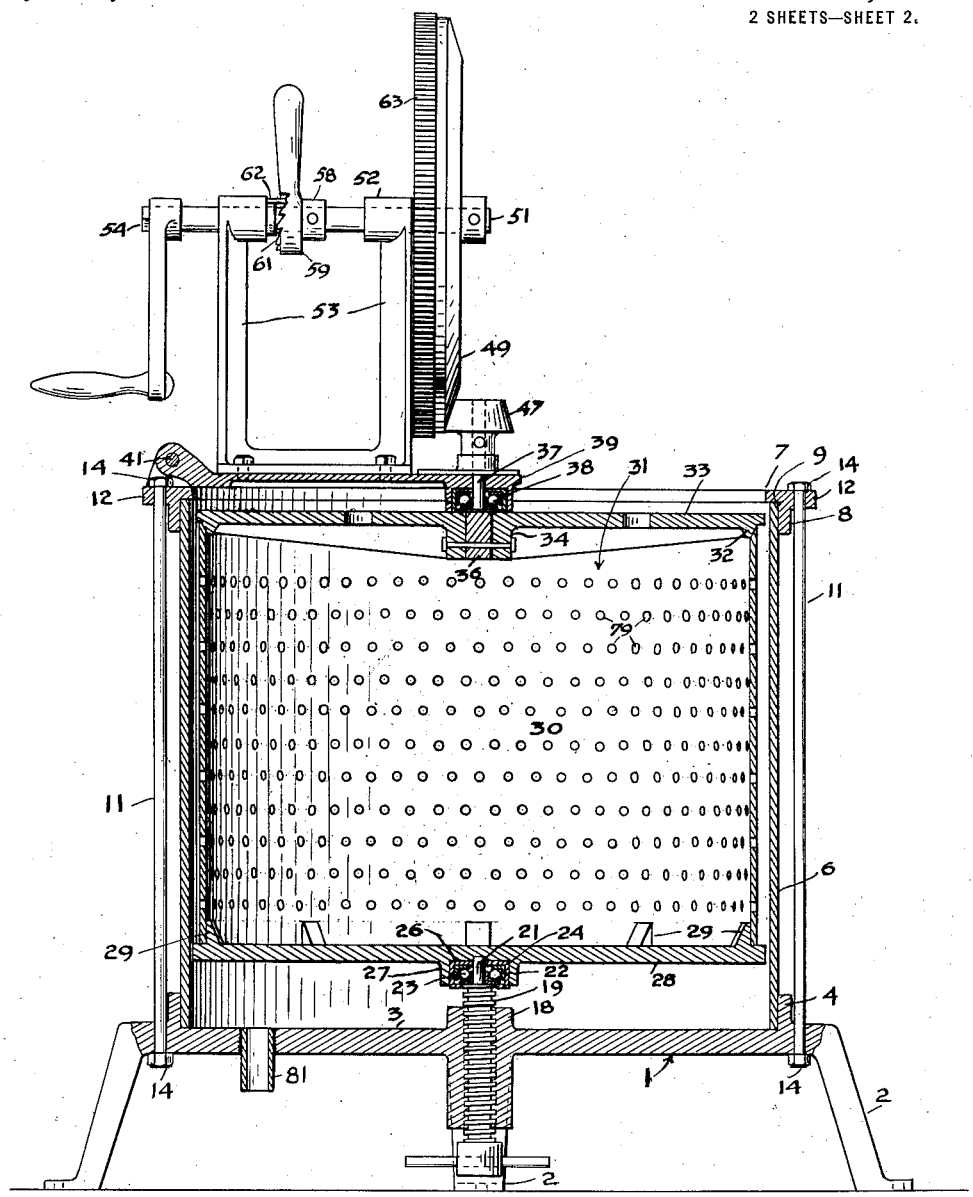

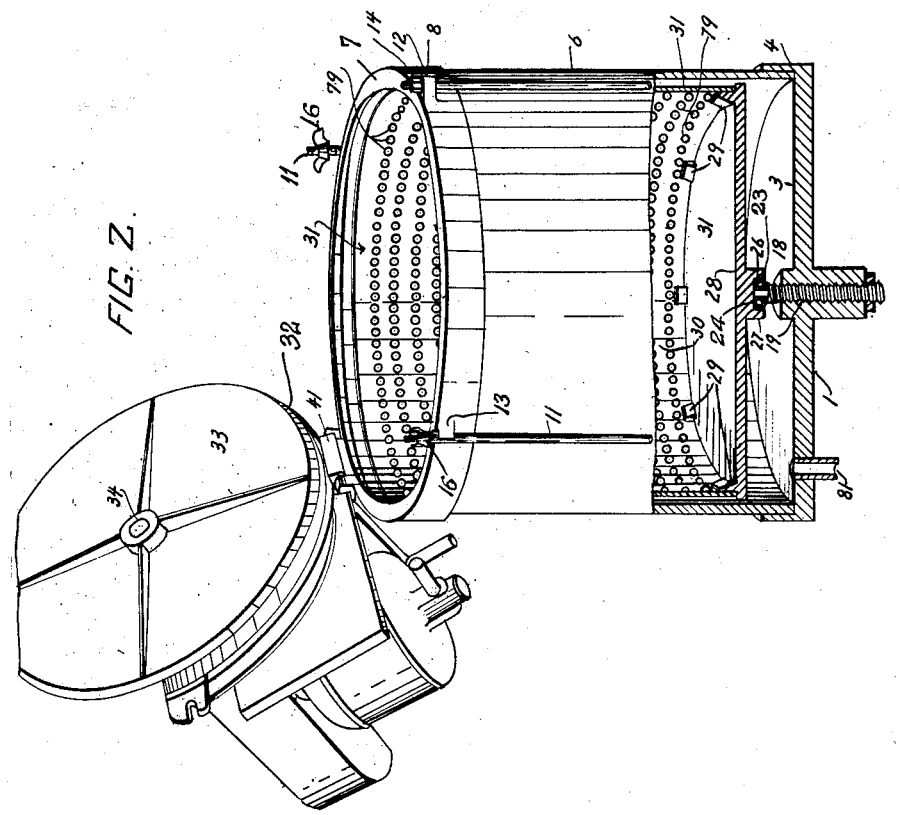
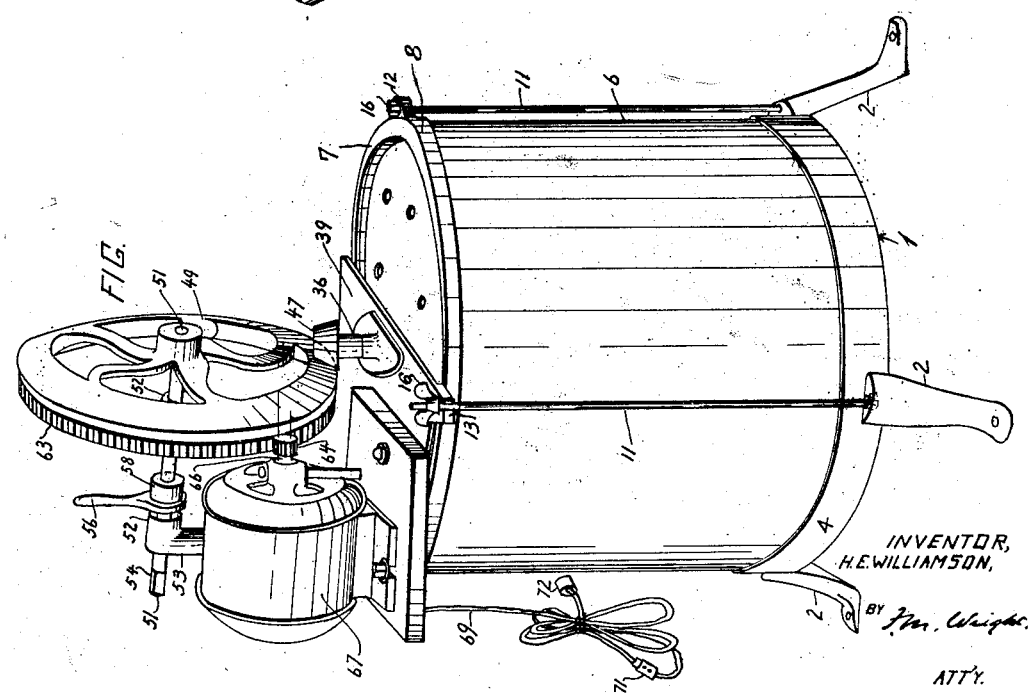

INVENTOR
H.E. WILLIAMSON

UNITED STATES PATENT OFFICE.

HERBERT E. WILLIAMSON, OF SAN FRANCISCO, CALIFORNIA.

CENTRIFUGAL WRINGER.

1,356,250.　　　Specification of Letters Patent.　　Patented Oct. 19, 1920.

Application filed June 24, 1919. Serial No. 306,415.

*To all whom it may concern:*

Be it known that I, HERBERT E. WILLIAMSON, a citizen of the United States, residing at San Francisco, in the county of San Francisco and State of California, have invented new and useful Improvements in Centrifugal Wringers, of which the following is a specification.

The object of the present invention is to provide a simple, effective and economically operated machine for wringing or drying washed clothes by centrifugal force.

In the accompanying drawing, Figure 1 is a perspective view of the machine, closed; Fig. 2 is a similar view of the same, open; and Fig. 3 is a vertical sectional view taken through the machine.

Referring to the drawing, 1 indicates a base, preferably of cast metal, comprising legs 2 and a plate 3 supported upon said legs and having an annular shoulder 4. Supported upon said plate 3 and in contact with said shoulder 4, is a cylindrical casing 6, upon the upper edge of which rests a ring 7, preferably of cast metal, having a downwardly extending portion 8 forming a shoulder 9 engaging the upper edge of said cylindrical casing 6, said ring 7 being secured in place by vertical bolts 11, which extend through the upper portions of said legs 2 and through lugs 12, on said ring, and are secured by nuts 14.

Formed centrally in said plate 3 is a support 18 for a vertical screw shaft 19, an upper portion of which shaft is reduced in diameter to form a shoulder 21, around which is a ball race 22, for balls 23, in an annular container 24, which is inserted in a downwardly opening socket 26 in a central downwardly extending boss 27 of a plate or casting 28. Inserted between lugs 29 extending upwardly from said plate or casting 28 is a cylindrical perforated wall 30 of a clothes container 31, which wall 30 is engaged by the beveled edges 32 of a plate 33 having a central boss 34 formed with an upwardly opening socket to receive an upwardly extending shaft 36 having a reduced portion 37 rotating in ball bearings 38 and extending through a hole in a plate 39 of semi-circular form, hinged, as shown at 41, to the ring 7 to swing upwardly, said shaft carrying, on its upper end, a bevel friction roller 47. Said friction roller is adapted to engage a beveled surface of a friction wheel 49, mounted on a shaft 51 carried by bearings 52 on supports 53 mounted on said plate 39, the outer end of said shaft being made angular, as shown at 54, to fit a socket in an operating handle. Said shaft 52 is slidable in said bearings and has secured thereon, between said bearings, a collar 58, and between said collar 58 and one of said bearings 53, is a cam 59, having a cam surface oblique to the shaft and therein a circular series of notches 61, into any one of which can enter a projection 62 from said bearing. By turning said cam, said projection can be caused to enter any one of said notches desired, thus shifting the shaft in the bearings 58 and causing the beveled friction wheel 49 to press against the beveled friction pinion 47 with any desired magnitude of pressure. Said friction wheel also has on its periphery, gear teeth 63 which mesh with a pinion 64 on the shaft 66 of an electric motor 67, supported on said plate and being supplied with electricity by a flexible cord 69, having therein a switch 71 and carrying a plug 72, enabling it to be electrically connected with any ordinary lamp socket.

Said plate 39 is held in its closed position between two of the bolts 11, extending through forked lugs 13 on said plate and being secured therein by thumb nuts 16.

The outer edge of said head or casting 33 being beveled, when said casting is brought down into its position engaging the upper end of the perforated cylinder 31, it wedges very tightly therein and the cylinder rotates with said head.

The mode of use of the device will be apparent from the foregoing description. The thumb nuts 16 having been loosened, and the bolts 11 having been moved out of the lugs 13, so as to free the plate 39, said plate, carrying with it the head 33, is swung on its hinge, to the position shown in Fig. 2, leaving the perforated container 31 open at the top for the insertion thereinto of the clothes to be dried. After said clothes have been placed in the perforated cylinder, the plate 39 is swung down, carrying with it the head 33, which, by the pressure exerted by the thumb nuts 16 screwed on said bolts 11, wedges the head 33 firmly down in the upper end of the perforated cylinder 31.

The cam 59 is now actuated to move the shaft 51 longitudinally in its bearings so as to press the beveled surface of the friction wheel 49 against the beveled surface of the friction pinion 47 and the shaft 51 is rotated, either by the handle placed on the free end of the shaft, or by the electric motor. If it is intended to rotate the shaft by the electric motor, said shaft is started in rotation by the electric motor before shifting the shaft by the cam to transmit its rotation to the casing head and casing, in order to avoid throwing the load upon the electric motor before it is started, which would probably result in burning out the electric motor. The rotation of the casing can thereby be started gradually, and eventually a high speed of rotation can be imparted to said casing.

Said casing is formed with a large number of perforations 79 so that, when the casing is rotated rapidly, the moisture in the clothes moves therefrom by centrifugal force and passes through the perforations 79 in the casing and into the space between the casing and the outer wall, flowing to the bottom of the chamber and being drawn off by a threaded pipe 81, which can be connected, if desired, to a hose pipe, for conducting the water to any suitable place of discharge.

I claim:—

1. In a centrifugal extractor, the combination of a casing, a perforated container within said casing, having an open top, means for rotatably supporting the container within the casing, a movable top for said casing, a top for said container rotatably carried by said casing top, and means for rotating said container top, carried by said casing top, said container top having means adapted to engage the upper edge of the container when the casing top is closed to cause said container to rotate with the container top.

2. In a centrifugal extractor, the combination of a casing, a perforated container within said casing, having an open top, means for rotatably supporting the container within the casing, a movable top for said casing, a top for said container rotatably carried by said casing top, and means for rotating said container top, carried by said casing top, and comprising a shaft extending through the casing top and centrally connected to the container, a bevel pinion secured to said shaft, a bearing supported on said casing top, a shaft rotatable in said bearing, a bevel wheel on said shaft and engaging said bevel pinion, and means for rotating said shaft, said container top having peripherally located means adapted to engage the upper edge of the container when the casing top is closed to cause said container to rotate with the container top.

3. In a centrifugal extractor, the combination of a casing, a perforated container within said casing, having an open top, means for rotatably supporting the container within the casing, a movable top for said casing, a top for said container rotatably carried by said casing top, and means for rotating said container top, carried by said casing top, and comprising a shaft extending through the casing top and centrally connected to the container, a friction pinion secured to said shaft, a bearing supported on said casing top, a shaft rotatable in said bearing, a friction wheel on said last named shaft, means for moving said last named shaft longitudinally in its bearing to press said wheel against said pinion, and means for rotating said last named shaft, said container top having means adapted to engage the container when the casing top is closed to cause said container to rotate with the container top.

4. In a centrifugal extractor, the combination of a casing, a perforated container within said casing, having an open top, means for rotatably supporting the container within the casing, a movable top for said casing, a top for said container rotatably carried by said casing top, and means for rotating said container top, carried by said casing top, and comprising a shaft extending through the casing top and centrally connected to the container, a bevel friction pinion secured to said shaft, a bearing supported on said casing top, a shaft rotatable in said bearing, a friction wheel on said last named shaft, means for moving said last named shaft longitudinally in its bearing to press said wheel against said bevel pinion, said wheel having gear teeth on its periphery, an electric motor, the shaft of which carries a toothed pinion engaging said gear teeth, and means for rotating said second named shaft, said container top having means adapted to engage the container when the casing top is closed to cause said container to rotate with the container top.

HERBERT E. WILLIAMSON.